Patented Apr. 21, 1925.

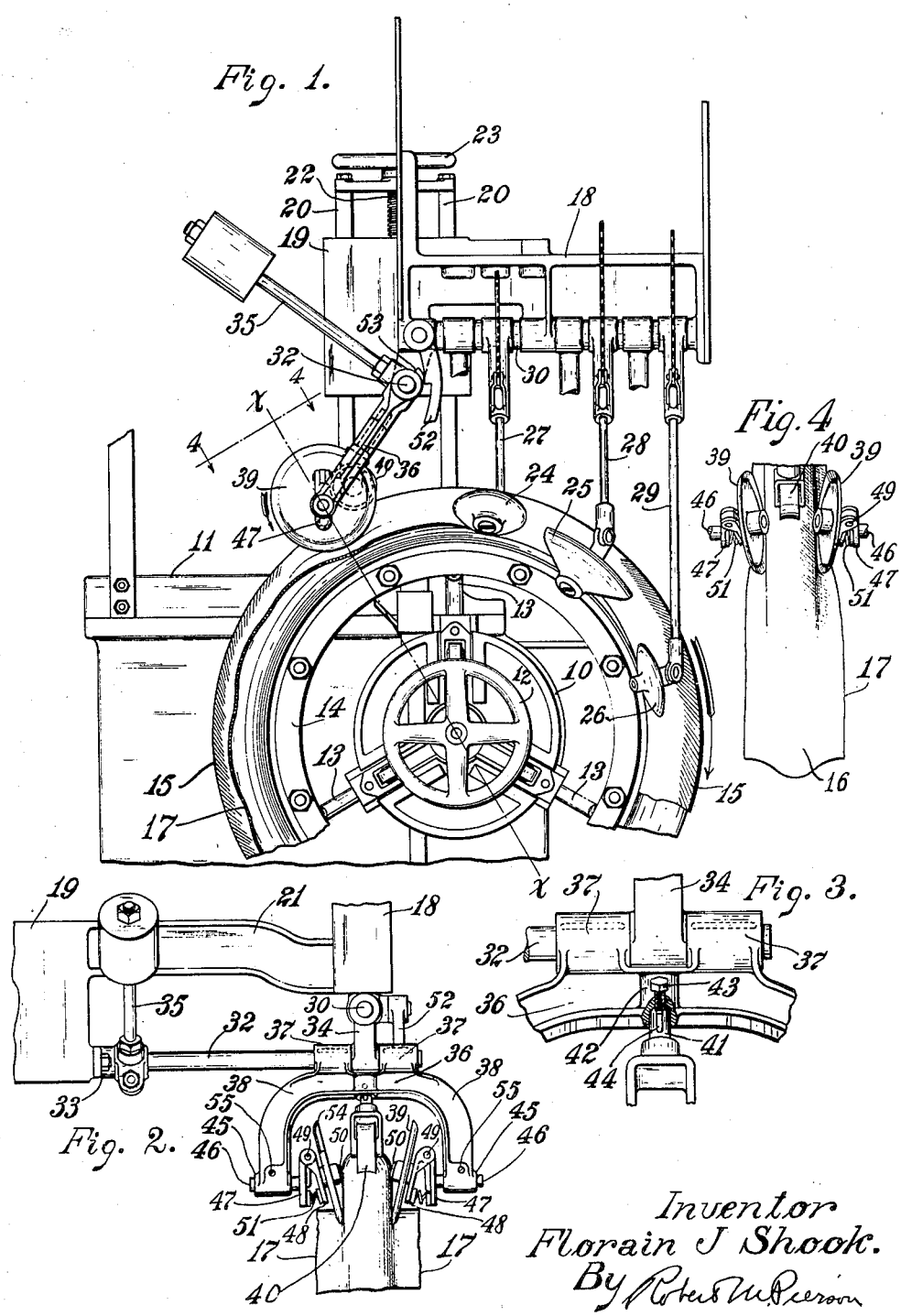

1,534,250

UNITED STATES PATENT OFFICE.

FLORAIN J. SHOOK, OF AKRON, OHIO, ASSIGNOR TO THE B. F. GOODRICH COMPANY, OF NEW YORK, N. Y., A CORPORATION OF NEW YORK.

TIRE-MAKING APPARATUS.

Application filed May 10, 1920. Serial No. 380,208.

*To all whom it may concern:*

Be it known that I, FLORAIN J. SHOOK, a citizen of the United States, residing at Akron, in the county of Summit and State of Ohio, have invented a certain new and useful Tire-Making Apparatus, of which the following is a specification.

This invention relates to apparatus for making pneumatic tire casings, and particularly to the means employed for shaping the middle or tread portion of the tire-forming strip or strips, where such means comprises a device having a substantially stationary operating position as distinguished from a spinning roller or rollers movable radially around the contour of the core or tire. Heretofore it has been a common practice to employ for this purpose a deeply grooved rubber roller made in two or more sections or disks adapted to be driven by the core at different angular speeds. The edge disks of such rollers have exerted an objectionable upward wiping action or drag upon the fabric at the rear end of their operative arc, and have been comparatively short lived. It is the principal object of my invention to avoid these disadvantages.

Of the accompanying drawings:

Fig. 1 is a front elevation of a tire-making machine having tread-rolling means embodying the present invention.

Fig. 2 is an edge view of the tread-rolling means and adjacent structure.

Fig. 3 is an enlarged detail view, showing means for adjustably holding one of the parts.

Fig. 4 is a plan view of the tread-rolling members and the work.

In these drawings I have shown a rotatable chuck 10 carried by a support 11 and having a wheel 12 operable to move chuck arms 13 radially outward to engage and rotate a ring core 14 on which strips 15 are formed into a tire carcass. The strip shown is an endless band of rubberized bias cord fabric, but the invention is adapted for use also on the ordinary strips of square-woven bias fabric wound circumferentially upon the core and partially shaped by stretching as they are laid. These cord bands 15, before being stretched on the core have a peripheral length less than the distance around the outer periphery of the core, and when stretched onto the latter, the middle or tread portion 16 of the band conforms partially to the shape of the crown of the core while the sides 17 stand out loosely as shown in Fig. 2 and at the left of Fig. 1.

18 is a horizontal tool-carrying member supported over the core by a block 19 slidably mounted on vertical guides 20 carried by the frame 11 in the rear of the core 14. The member 18 is rigidly connected to the block 19 by a rearwardly-extending horizontal arm 21, and the block, arm and member may be adjusted vertically by means of a screw 22, operated by a wheel 23, to vary the vertical positions, relatively to the core, of certain side-smoothing tools 24, 25, 26, which are preferably employed but are not involved in the present invention. These tools are carried on the lower ends of arms 27, 28, 29 pivotally mounted on a common fixed shaft 30 forming a part of the tool support, and they operate at different stationary radial positions on the sides of the core 14 to work the flared sides 17 of the band 15 against the core or the previously-laid ply or bend of fabric, an under ply 31 being indicated in broken lines in Fig. 2.

32 is a horizontal tool supporting shaft mounted in bearings 33 and 34 carried respectively by the block 19 and the shaft 30. This shaft carries a weighted arm 35 rigidly connected thereto adjacent the end supported by the bearing 33; and it also carries a tool-supporting yoke 36 having hubs 37 keyed to the shaft 32 on opposite sides of the bearing 34. The weighted arm tends to rotate the yoke toward the core 14. This yoke has two arms 38 straddling the plane of the core and supporting a pair of disk wheels 39. The yoke and wheels are supported in their operative positions with relation to the core by a concave middle roller 40 which rests on the core or the outer fabric ply. Roller 40 is mounted in a bearing fork whose stem 41 is slidable in a socket 42 and adapted to be secured by a set-screw 43 whose inner end occupies a groove 44 in said stem to keep the latter from turning, whereby the roller 40 may be fixed in different positions on the yoke so as to determine the point of radial contact of the disk-wheels 39 on the tire.

On the ends of the arms 38 are holders 45 each fixedly carrying a rod 46 axially and angularly adjustable therein and having on its inner end one element 47 of a transversely disposed hinge or knuckle joint. The other element 48 of the joint is connected thereto by a hinge pin 49 and carries a stub shaft 50 on which one of the wheels 39 rotates freely. 51 is a short coiled spring placed between the free ends of the elements of each hinge, separating them, and holding the wheel at an angle to the rod 46 and to the plane of the core and pressing the lower forward part of the wheel against the latter at substantially the thickest part thereof.

When the wheels 39 are raised above the tire a spring pressed pawl 52 engages a cog 53 carried by one of the hubs 37 holding the wheels in an elevated position. The springs 51 then force a part of each wheel inwardly above the core. As the wheels are lowered to their operative positions, these parts of the wheels are separated by sliding over the oppositely curved surfaces of the core crown or a strip thereon, the outer edge 54 of each wheel being rounded to prevent a cutting of the fabric.

Set screws 55 holding the rods 46 in the members 45, may be loosened and the spacing of the wheels 39 changed by axially moving the rods in the rod holding members. The rods 46 may also be rotated to vary the angular positions of the hinge elements relative to the axial plane $x$ of the core which passes through the center of the rods 46. By thus changing the angular and axial positions of the wheel supporting members, the wheels may be made to merely shape the carcass forming strips over the crown of the core or to stretch the middle part of the strips as they pass between the rollers.

As is best shown in Figs. 2 and 4, each of the wheels is supported in a plane at a small acute angle to the plane of the core and contacts with the fabric on a short arc on the forward side of its circumference. When the core is rotated the wheels are rotated by contact therewith and have a wiping action only toward the inside of the core. The weighted arm presses the wheels toward their operative positions but should the latter tend to ride up onto the core crown the screw 22 may be operated to raise the block 19 and increase the angle between the yoke and the plane $x$. The wheels are preferably made of a metal, as aluminum, which is light and will stand up a long time under use. The wiping action of the wheels does not vary over long periods of use as compared to the flexible grooved wheels which wear thin, exert a gradually decreasing wiping action on the fabric and last but a few weeks. A set of wheels may be adjusted to give the wiping action necessary to shape the middle part of a tire forming strip between them over a core crown and they may also be adjusted to operate on tires of different sizes.

I claim:

1. In tire-making apparatus, the combination with a rotatable tire-forming core of a fabric-shaping wheel, a pivoted arm constituting a mounting for said wheel, yielding means for urging said arm about its pivot, a mounting for said pivoted arm, and means for adjusting said mounting from and toward the axis of the core to swing said arm in a direction parallel with the plane of the core to vary the action of said yielding means.

2. In tire-making apparatus, the combination with a rotatable tire-forming core of a mounting adjustable in the plane of said core, an arm pivoted upon said mounting, a fabric-shaping wheel mounted on said arm in a plane of revolution at an angle to that of the core, and means for adjusting said mounting from and toward the axis of the core to swing said arm about its pivot and thus change the angle of said fabric-shaping wheel to the surface of the core.

3. In a tire-making apparatus, the combination with a rotatable tire-forming core mounted in a vertical plane, of a disk wheel having a fixed operative position in a plane at an angle to the plane of the core, a wheel supporting member, and means carried thereby and resting on the core or a tire forming strip thereon for holding the wheel in its operative position at one side of the core crown.

4. In a tire-making apparatus, a tire-forming core, a yoke having arms straddling the plane of the core, tire engaging disk wheels carried by the said arms on the opposite sides of the core, the wheels lying in planes intersecting the plane of the core, and a wheel carried by the said yoke and resting on the core or a tire forming strip thereon for holding the disk wheels in their operative positions against the crown of the core.

5. In a tire-making apparatus, a tire forming core mounted in a vertical plane, a pivoted yoke having arms straddling the plane of the core, spring-pressed tire engaging wheels carried by the said arms on the opposite sides of the plane of the core, weighted means connected to the yoke and normally pressing the latter toward the core, and a supporting wheel carried by the said yoke in contact with the core or a tire forming strip thereon for holding said wheels in their operative positions on the sides of the core crown, the supporting wheel being adjustable relative to the yoke to vary the said operative positions.

6. In a tire-making apparatus, a tire forming core, a shaft having a fixed operative position substantially at right angles to the core adjacent a side thereof, a disk wheel having a wiping action on a side of the tire in one direction only when the core and wheel are rotated, a journal on which said wheel rotates, and means connecting said journal to the shaft at an angle to the latter whereby a rotation of the shaft varies the point of contact between the wheel and core.

7. In a tire-making apparatus, a tire forming core, a disk wheel having an operative position against a side thereof, a support at one side of the core, a shaft carried thereby, and means connecting the wheel and shaft and comprising a hinge having two members connected to the wheel and shaft respectively, and resilient means tending to separate the hinge members.

8. In a tire-making apparatus, a tire-forming core rotatably mounted in a vertical plane, a movable support, a yoke pivoted thereon and having arms straddling the plane of the core, a roller carried by the yoke and resting on the core or a tire forming strip thereon, tire engaging wheels carried by the said arms in planes at acute angles to the plane of the core, means for adjusting the position of the block relative to the core to vary the operative position of the yoke, and means operating on the yoke to hold it in its operative position.

In witness whereof I have hereunto set my hand this 28th day of April, 1920.

FLORAIN J. SHOOK.